United States Patent [19]
Carr

[11] Patent Number: 5,428,733
[45] Date of Patent: Jun. 27, 1995

[54] METHOD OF CALCULATING DIMENSIONS AND POSITIONING OF RECTANGULAR BALLOONS

[75] Inventor: Randy L. Carr, Boulder Creek, Calif.

[73] Assignee: Apple Computer, Inc., Cupertino, Calif.

[21] Appl. No.: 807,495

[22] Filed: Dec. 16, 1991

[51] Int. Cl.⁶ ............................................. G06F 15/62
[52] U.S. Cl. .................................. 395/159; 395/157; 395/161; 395/139
[58] Field of Search ............................... 395/155–161, 395/139, 117; 345/117–120

[56] References Cited

U.S. PATENT DOCUMENTS

| | | | |
|---|---|---|---|
| 4,648,062 | 3/1987 | Johnson et al. | 395/161 |
| 4,789,962 | 12/1988 | Berry et al. | 395/161 |
| 4,964,077 | 10/1990 | Eisen et al. | 395/161 |
| 5,029,113 | 7/1991 | Miyoshi et al. | 395/161 |
| 5,146,548 | 9/1992 | Bijnagte | 395/117 |
| 5,157,768 | 10/1992 | Hoeber et al. | 395/157 |
| 5,287,448 | 2/1994 | Nicol et al. | 395/159 |
| 5,309,555 | 5/1994 | Akins et al. | 395/157 |

OTHER PUBLICATIONS

Programming Techniques: Microsoft C/C++, Microsoft Corp., 1991, pp. 146–165.

Primary Examiner—Mark R. Powell
Assistant Examiner—John E. Breene
Attorney, Agent, or Firm—Blakely, Sokoloff, Taylor & Zafman

[57] ABSTRACT

An iterative method for calculating and positioning a rectangular balloon containing information in an interactive environment with sensitive areas. A balloon is positioned near, but not overlapping, the sensitive areas of a display screen and is sized based on the amount of information to be displayed in the balloon. Each balloon has a body and a tip extending towards the sensitive area. The balloon's position and size is calculated by first initializing the balloon to a preferred variant. If the body does not fit entirely on the screen, a new tip orientation and body is selected while maintaining a golden ratio of height and width. In addition, a new body and tip orientation is selected that displays the largest amount of information if the body does not entirely fit on the display screen.

11 Claims, 8 Drawing Sheets 5,428,733

METHOD OF CALCULATING DIMENSIONS AND POSITIONING OF RECTANGULAR BALLOONS

FIELD OF THE INVENTION

The present invention relates to a method of providing balloon help to computer users. In particular, the present invention relates to a method of calculating the dimensions of an aesthetically pleasing rectangular balloon and a method of positioning a balloon relative to a sensitive area of a display screen.

BACKGROUND OF THE INVENTION

Prior computer systems provide helpful information to on-line computer users in a help-mode. One prior help mode displays help information to computer users in graphic screen objects, which are commonly called balloons. In prior computer systems help balloons may be positioned arbitrarily. Often the help balloon obscures the item that prompted the request for help. This is a disadvantage for computer users who are frequently interrupted and may not readily recall why they requested help.

Some prior systems utilize standard balloon sizes. Every balloon is the same size regardless of the amount of information displayed within the balloon. Standard sized balloons can produce aesthetically displeasing results.

SUMMARY OF THE INVENTION

An object of the present invention is to provide a method of positioning help balloons that does not obscure the item that prompted the help request.

Another object of the present invention is to provide a method of creating pleasingly sized help balloons.

A still further object of the present invention is to provide a method of quickly calculating the dimensions rectangular balloons having an aesthetically pleasing ratio.

An iterative method of quickly calculating the dimensions of a rectangular balloon having a golden mean is described. A golden mean defines a rectangle in which the lesser of the two dimensions is to the greater of the two dimensions as the greater is to the sum of both.

The computation begins by computing a minimum area for the balloon based upon the size of the information to displayed in the balloon. This area is then used to calculate a initial value of a first dimension, which may be either height or width. The second, or other, dimension is initially defined as the lesser of the two dimensions. An initial value for the second dimension is then calculated accordingly.

The information is then displayed if the information fits in the rectangular balloon having the initial first and second dimensions. If not, a second value of the second dimension is calculated by defining the second dimension as the greater dimension and maintaining the first dimension at its initial value.

The information is then displayed on the monitor if the information fits in a rectangular balloon having the second value of the second dimension and the initial value of the first dimension. If, on the other hand, the information does not fit then the first dimension is increased to a second value. Afterward, it is determined whether the information fits in a rectangular balloon having first and second dimensions equal to their second values. If so, the information is displayed on a monitor within a balloon having said values. Otherwise the first and second dimensions are repeatedly increased, one at a time, until the dimensions are found for a balloon large enough to encompass the information.

Also described is a method of positioning a balloon near a sensitive area within a display screen or a monitor. Positioning of the balloon begins by initializing the balloon to a preferred variant. If the balloon fits within the display screen, the balloon is displayed. On the other hand, if the balloon does not fit on the display screen a new tip orientation is selected from a set of possible tip orientations. If this balloon fits within the display screen, the balloon is displayed. If the balloon does not fit on the display screen a new body orientation is selected. These steps are repeated until a balloon variant is found that fits on the display screen or all tip orientations have been tried. If no variant can be found which fits entirely within the display screen then the balloon which displays the largest amount of information is displayed.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
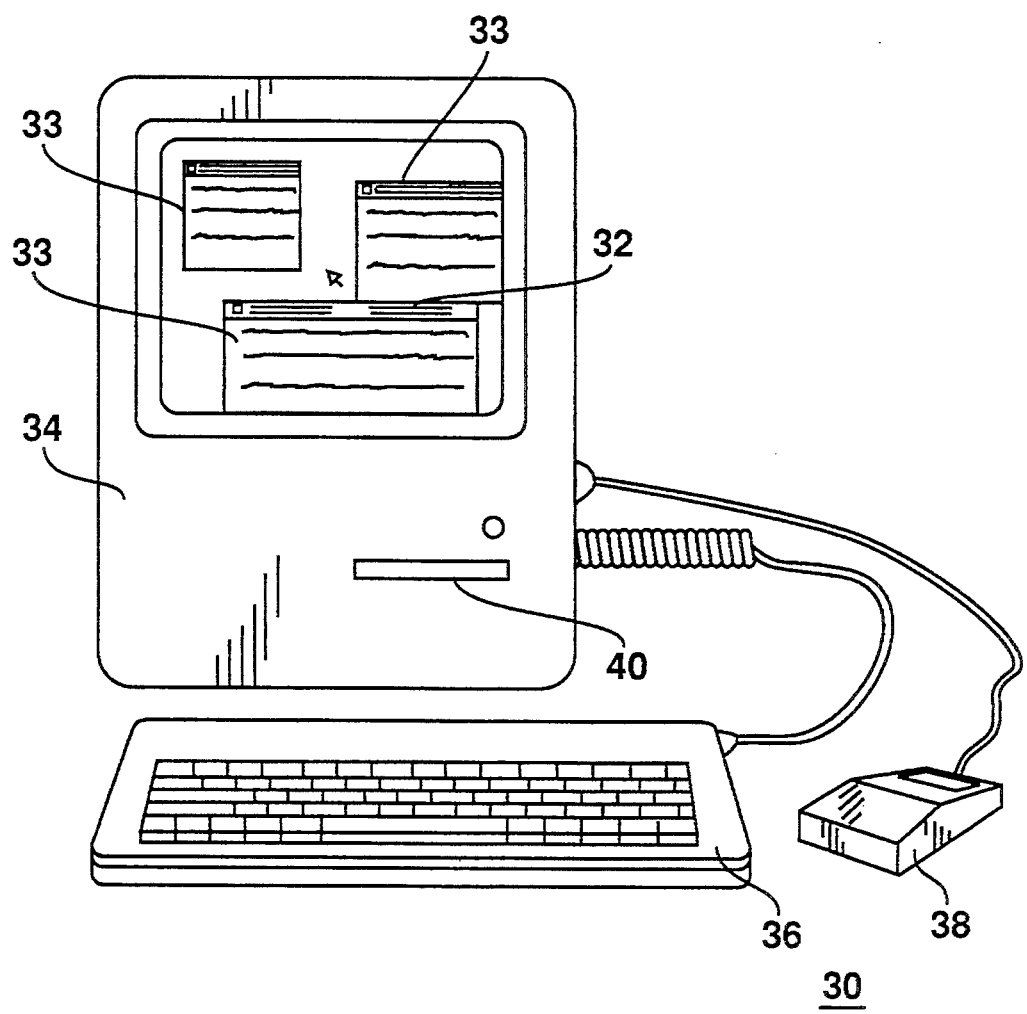
FIG. 1 is a diagram of a computer system.

FIG. 1 illustrates a computer system 30 in which the present invention operates. Computer system 30 includes a monitor 32 for visually displaying information to a computer user, and a central processing unit and internal memory, enclosed by housing 34. Monitor 32 may be divided into multiple display screens 33, according to the computer user's wishes. Keyboard 36 allows a computer user to provide input to the central processing unit. By moving mouse 38 a computer user may move a pointer on monitor 32. Mouse 38 and its associated pointer are typically used to select graphical objects known as icons, which are also displayed on monitor 32. Computer system 30 also includes a disk drive 40, which reads software stored on floppy disks.

The present invention is stored in computer system 30, either within internal memory or on floppy disk. As will be described in detail below, the present invention alters the operation of computer system 30, allowing it to display help information on monitor 32. Creating help information and displaying balloons is a multistep process. First, the text of the help information is created using computer system 30. Second, the dimensions of a balloon large enough to encompass the information are calculated by computer system 30 using the method of the present invention. Third, and finally, the computer system 30 displays the help balloon using the positioning method of the present invention. The positioning method helps prevent the obscuring of a selected sensitive area associated with the help information.

As will be described in detail below, the present invention quickly calculates the dimensions of a rectangular balloon having a golden mean. Briefly described, the calculation is an iterative process involving three steps that are repeated as necessary to find dimensions of a balloon large enough to display the desired information. An initial area is calculated based upon the size of the information. Using this area, an initial value of a first dimension, either height or width, is calculated by defining the second of the two dimensions as the lesser of the two dimensions. An initial value of the second dimension is then calculated. These dimensions are then checked to see if the information fits within such a balloon. If not, a second value of the second dimension is calculated by redefining the second dimension as the greater of the two dimensions and maintaining the first dimension at its initial value. These new dimensions are then checked to see if the information fits within such a balloon. If the information does not fit, the value of the first dimension is increased. The two dimensions are increased in the same order until a rectangle with large enough dimensions to accommodate the information is found.

Having calculated the dimensions of the balloon it may now be displayed on monitor near 32, a sensitive area with which the balloon is associated. Briefly stated, the present invention is an iterative process that begins by initializing the balloon to a preferred variant. If the balloon fits within the display screen, the balloon is displayed. On the other hand, if the balloon does not fit on the display screen a new tip orientation is selected from a set of possible tip orientations. If this balloon fits within the display screen, the balloon is displayed. If the balloon does not fit on the display screen a new body orientation relative to the sensitive area is selected. These steps are repeated until a balloon is found that fits on the display screen or all tip orientations have been tried. If no balloon can be found which fits entirely within the display screen then the balloon which displays the largest amount of information is displayed.

Figure 2:
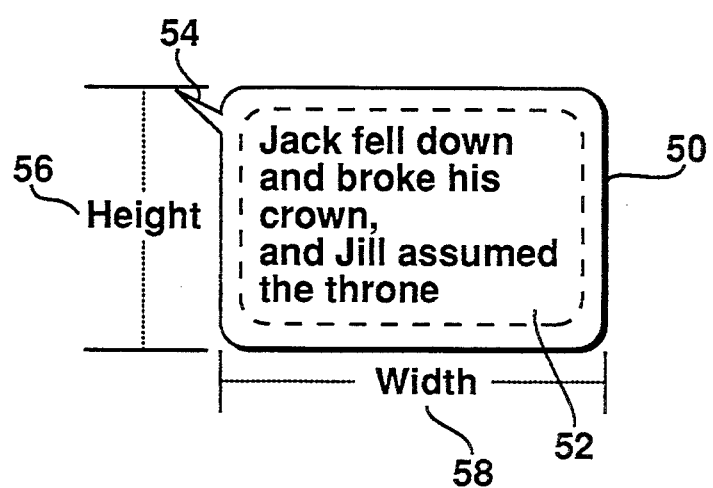
FIG. 2 illustrates a graphic balloon.

FIG. 2 illustrates a graphic object known as a balloon 50. Balloon 50 is used to display help information, which may take the form of text or graphics. Help information is displayed in the content area 52 of balloon 50.

Balloon 50 includes a body 51, which encloses the help information, and a balloon tip 54. Balloon tip 54, also referred to as cartouche 54, points to a sensitive area with which balloon 50 is associated. Typically, the sensitive area is associated with a graphic object, such as an icon.

FIG. 2 shows balloon tip 54 located on the upper, left side of balloon body 51. Such a tip orientation is appropriate when balloon body 51 is positioned below and to the right of a sensitive area. Other balloon tip 54 orientations may be appropriate depending on the location of balloon body 51 relative to the sensitive area. FIG. 3 illustrates a number of cartouche orientations. As can be seen, cartouche 54 may be located on any of the balloon's four sides: top, bottom, left, or right. Further, on each side, there are two possible positions for balloon tip 54. On the top and bottom sides cartouche 54 may reside near the left or right corners. Analogously, on the left and right sides balloon tip 54 may be located near the upper or lower corners.

Figure 3A:
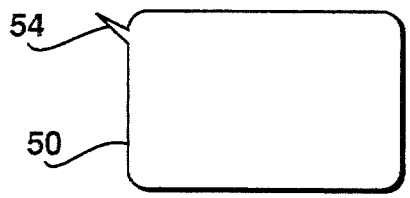
FIGS. 3 illustrates possible balloon tip orientations.
Figure 3E:
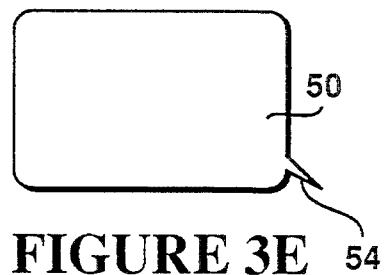
Figure 3B:
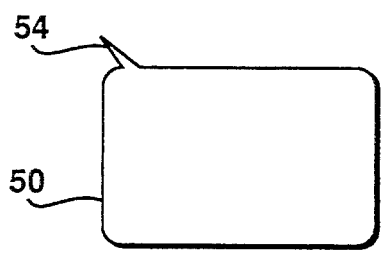

In FIG. 3B balloon tip 54 is located on on the left corner of the top of balloon 50. The balloon tip of FIG. 3B is appropriate when balloon body 51 is positioned above and to the right of a sensitive area.

Figure 3F:
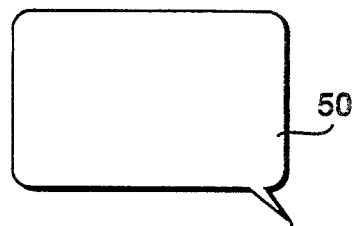
Figure 3C:
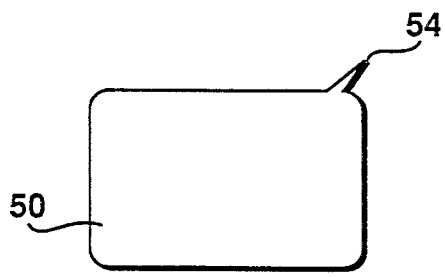

In FIG. 3C balloon tip resides near the opposite corner of balloon body 51; i.e. near the right corner of the top of balloon 50. The tip of FIGS. 3C is appropriate when balloon body 51 is positioned below and to the left of a sensitive area.

Figure 3G:
Figure 3D:

Balloon tip 54 is attached on the top of body 51 near its upper right corner in FIG. 3D. The tip of FIG. 3D is appropriate when balloon body 51 is positioned below and to the right of a sensitive area.

In FIG. 3E cartouche 54 resides near the bottom corner of the right side of balloon 50. The tip orientation of FIG. 3E is appropriate when balloon body 51 is positioned above and to the left of a sensitive area.

Cartouche 54 is located on bottom of balloon 50, near the right corner, in FIG. 3F. The tip orientation of FIG. 3F is appropriate when balloon body 51 is positioned above and to the left of a sensitive area.

Balloon tip 54 is located near the opposite corner, the left corner, of the bottom of balloon 50 in FIG. 3G. The balloon tip orientation of FIGS. 3G is appropriate when balloon body 51 is positioned above and to the right of a sensitive area.

Figure 3H:
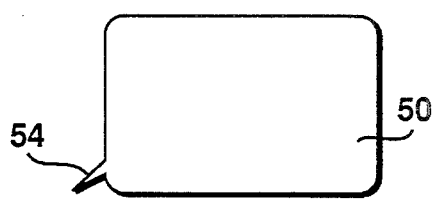

In FIG. 3H balloon tip 54 resides near the lower corner of the left side of balloon 50. The balloon tip orientation of FIG. 3H is appropriate when balloon body 51 is positioned below and to the right of a sensitive area.

Balloon body 51 has a generally rectangular shape, with rounded corners. Body 51 has an aesthetically pleasing ratio of balloon height 56 to balloon width 58, called a golden section or a golden mean. A golden section occurs when the lesser of two dimensions is to the greater as the greater is to the sum of both the lesser and greater dimensions. A golden section is created when this ratio is between 0.618 to 1.000.

Figure 4:
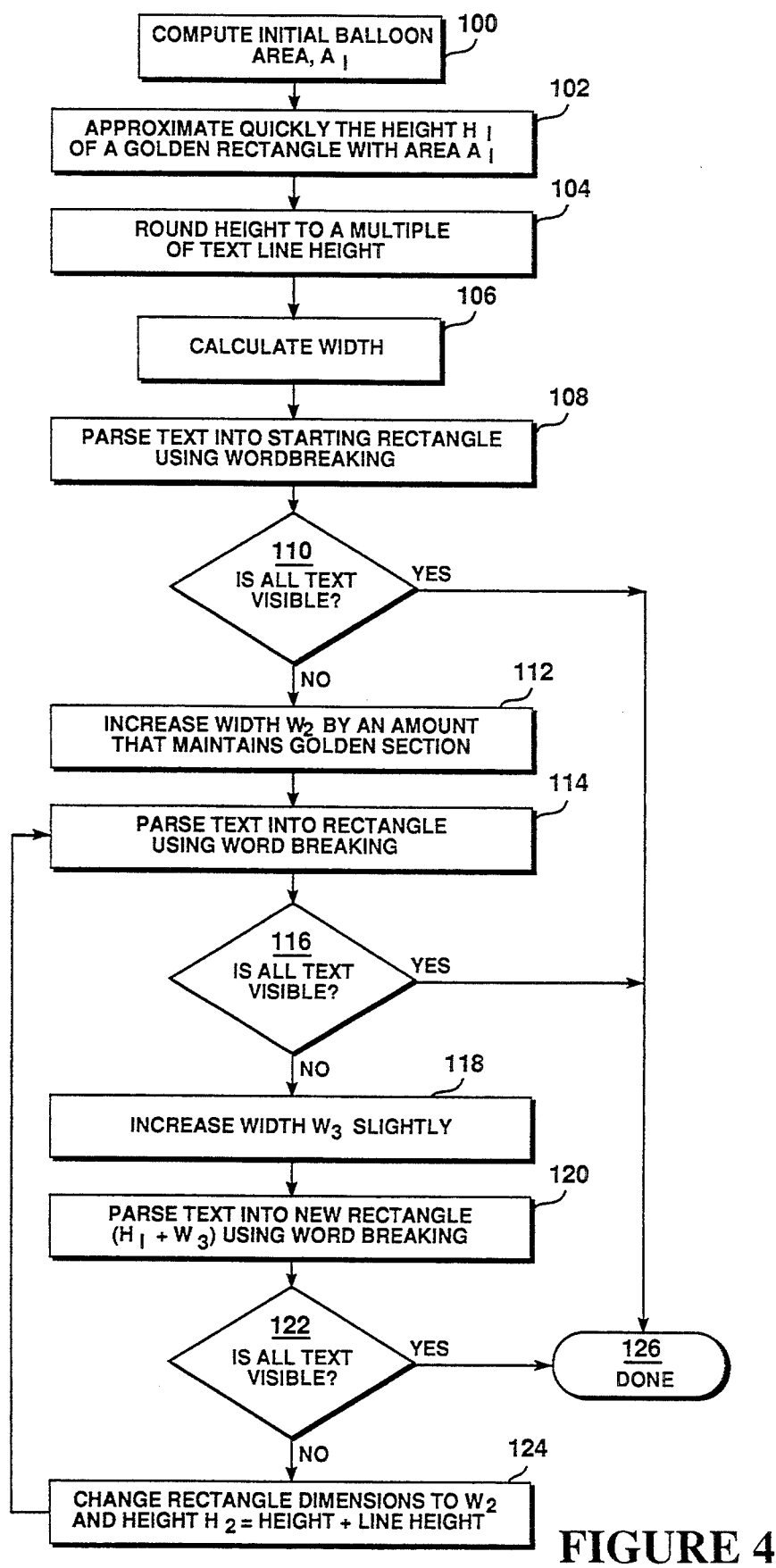
FIG. 4 is a flow diagram of a method of calculating balloon dimensions.
Figure 5A:
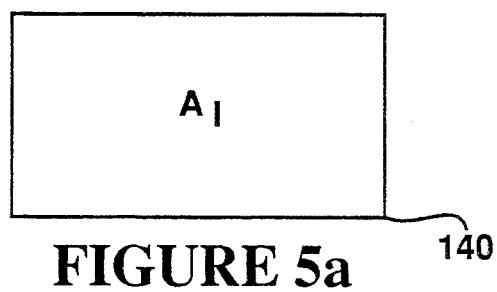
FIG. 5 illustrates the various balloons resulting from balloon dimension calculations.
Figure 5B:
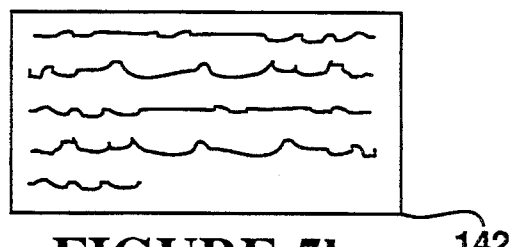
Figure 5C:
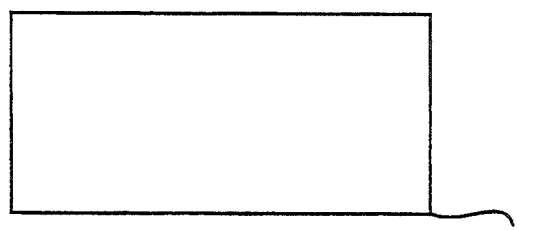
Figure 5D:
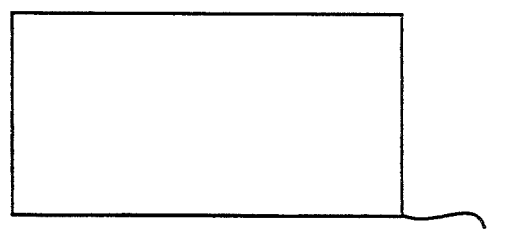

FIG. 4 illustrates a method of quickly calculating the dimensions of a balloon preferably having a golden section. Prior to beginning calculation of balloon dimensions, the user should have selected the help information to be displayed in the balloon, the font and the font size, if appropriate.

Calculation of balloon dimensions by computer system 30 begins in step 100 by calculating an initial balloon area. The initial area $A_1$ is computed by multiplying the length of the text to be displayed by the text line height for the font size to be used. If the help information is graphics, the initial area may also calculated in terms of a font size.

The initial area $A_1$ is used in step 102 to calculate an initial height for a balloon with a golden rectangle. In the preferred embodiment the golden ratio is chosen to be 0.618 and the width is initially defined the lesser of the balloon's two dimensions. In other words:

$$W_1 = 0.618\, H_1$$

The height of a rectangle is then calculated by dividing initial area by the initial width; i.e:

$$H_1 = A_1/W_1$$

To solve the equation the term $0.618\, H_1$ is substituted for the width, $W_1$. Thus:

$$H_1 = A_1/(0.618 \, H_1)$$

Solving for $H_1$ the equation becomes:

$$H_1 = (A_1/0.618)^{\frac{1}{2}}$$

$$H_1 = (1.618 \, A_1)^{\frac{1}{2}}$$

To save time in the computation of $H_1$ an approximation is made; to wit $$1.618 = (1272/1000)^2$$

Substituting this approximation into the equation for $H_1$ the equation becomes:

$$H_1 = (1272/1000)*(A)^{\frac{1}{2}}$$

This approximation allows the quick computation of initial height $H_1$ of a golden rectangle.

Next, in step 104, the initial height $H_1$ is rounded up to a multiple of the text line height to ensure that all the text will be visible in the balloon. This new height is called the starting height, $H_S$.

The starting width $W_S$ is calculated in step 106. The starting width $W_S$ is calculated by dividing the initial area $A_1$ by starting height $H_S$. In other words, $W_S$ is found by solving:

$$W_S = A_1/H_S$$

Thus, after completing step 106 the dimensions of a golden rectangle $R_1$ 140 have been calculated. The text will fit into $R_1$ 140 and be visible without word-breaking; i.e. without inserting spaces between words and sentences.

In step 108, computer system 30 parses the text into the initial golden rectangle $R_1$ 140. Word-breaking of text is used as necessary to prevent words from appearing on more than one line.

Afterward, computer system 30 determines in step 110 whether all the text fits into the initial rectangle $R_1$ 140. If so, the method ends by branching to step 126. If all the text does not fit into $R_1$ 140 the calculation of balloon dimensions continues in step 112.

A goal of step 112 is calculate the dimensions of a second golden rectangle $R_2$ 142 with greater area than $R_1$ 140, into which the text will hopefully fit. Another goal of step 112 is quickly calculate the dimensions of $R_2$ 142 while maintaining the golden section. These goals are achieved by increasing only one of the dimensions of $R_2$ 142 with respect to $R_1$ 140. In the preferred embodiment the width $W_S$ is increased to $W_2$ while height $H_S$ is held constant. The width of $W_2$ is calculated to maintain a golden section. To achieve these goals the width $W_2$ is defined as the greater of the balloon's two dimensions. The golden ratio remains set at 0.618. In other words:

$$H_S = 0.618 \, W_2$$

Solving for $W_2$ the equation becomes:

$$W_2 = 1.618 \, H_S$$

Thus, in step 112 the dimensions of a second golden rectangular balloon $R_2$, having a width $H_S$ and width $W_2$, are calculated.

Computer system 30 parses the text into rectangle $R_2$ 142 in step 114. As in step 108, word-breaking is used as necessary.

In step 116, computer system 30 determines whether all the text fits within rectangle $R_2$ 142. If so, the method ends by branching to step 126. If all the text does not fit into $R_2$ 142 the calculation of balloon dimensions continues in step 118.

The goals of step 118 are similar to those of step 112. In step 118 the dimensions of a third rectangle $R_3$ 144 with greater area than $R_2$ 142 into which the text will hopefully fit. Another goal of step 112 is quickly calculate the dimensions of $R_3$ 144. These goals are achieved by increasing only one of the dimensions with respect to $R_2$ 142. The width $W_2$ is increased to $W_3$ while $H_S$ is remains constant. Again, the width $W_3$ is defined the greater of the balloon's two dimensions. Step 118 differs from step 112 in that the golden ratio of 0.618 is not maintained. Instead, the width is increased only slightly to avoid adding a new line to the balloon just to accommodate one word. This choice is made because lines with only a single word in them are not aesthetically pleasing. Thus, $W_3$ is calculated as:

$$W_3 = 1.618(H_S + \text{line height})$$

Note that for quick computation the term 1.618 may be approximated as $(1272/1000)^2$.

The result of step 118 is a new rectangle $R_3$ 144 having dimensions of $H_S$ and $W_3$.

In step 120 computer system 30 parses the text into rectangle $R_3$ 144, using wordbreaking as necessary.

It is determined whether all the text fits within rectangle $R_3$ 144 in step 122. If all the text fits into rectangle $R_3$ 144, computer system 30 ends its calculation of balloon dimensions by branching to step 126. If all the text does not fit into $R_3$ 144 the calculation of balloon dimensions continues.

Having reached step 120, it is reasonable to assume that rectangle $R_2$ was too small for the text by more than one word. Therefore, the height of the balloon is increased to by a line height allow several more words to fit into rectangle $R_4$ 146 as compared to previous rectangles. In other words, the height is changed from $H_S$ to $H_2$ where:

$$H_2 = H_S \text{line height}$$

To save time, computer system 30 sets the width of rectangle $R_4$ 146 to $W_2$. As a result, rectangle $R_4$ 146 does not have a golden section.

From step 124, computer system 30 branches back to step 108 to parse the text into rectangle $R_4$ 146. From step 108 computer system 30 branches through steps 110, 112, 114, 116, 118, 120, 122, 124, and 126 until the information fits into a rectangle.

In an alternative embodiment, the balloon height may be the first dimension to be increased in the algorithm of FIG. 4.

Having selected the text of the help message and calculated balloon dimensions, computer system 30 is ready to display balloon 50 on monitor 32. Balloon 50 may be displayed whenever activated by computer system 30. In the preferred embodiment, computer system 30 continuously monitors the position of a pointer. Whenever the pointer moves within a sensitive area associated with an icon and a help message, computer system 30 uses the method of positioning balloons of the present invention to display the help balloon.

The method of positioning balloons preferably displays balloons adjacent to an icon or graphic object with which its is associated. If possible, the balloon is positioned by computer system 30 to avoid obscuring the icon with which the balloon is associated. The method of positioning balloons adjusts to changing positions of the icon on monitor 32 and to placement of the icon within differing and multiple screen displays, which are also called windows. The method allows computer system 30 to do so by utilizing multiple balloon and tip orientations. Preferred positions may be specified for each balloon. The preferred position will be overridden when it is inappropriate, however.

Figure 6:
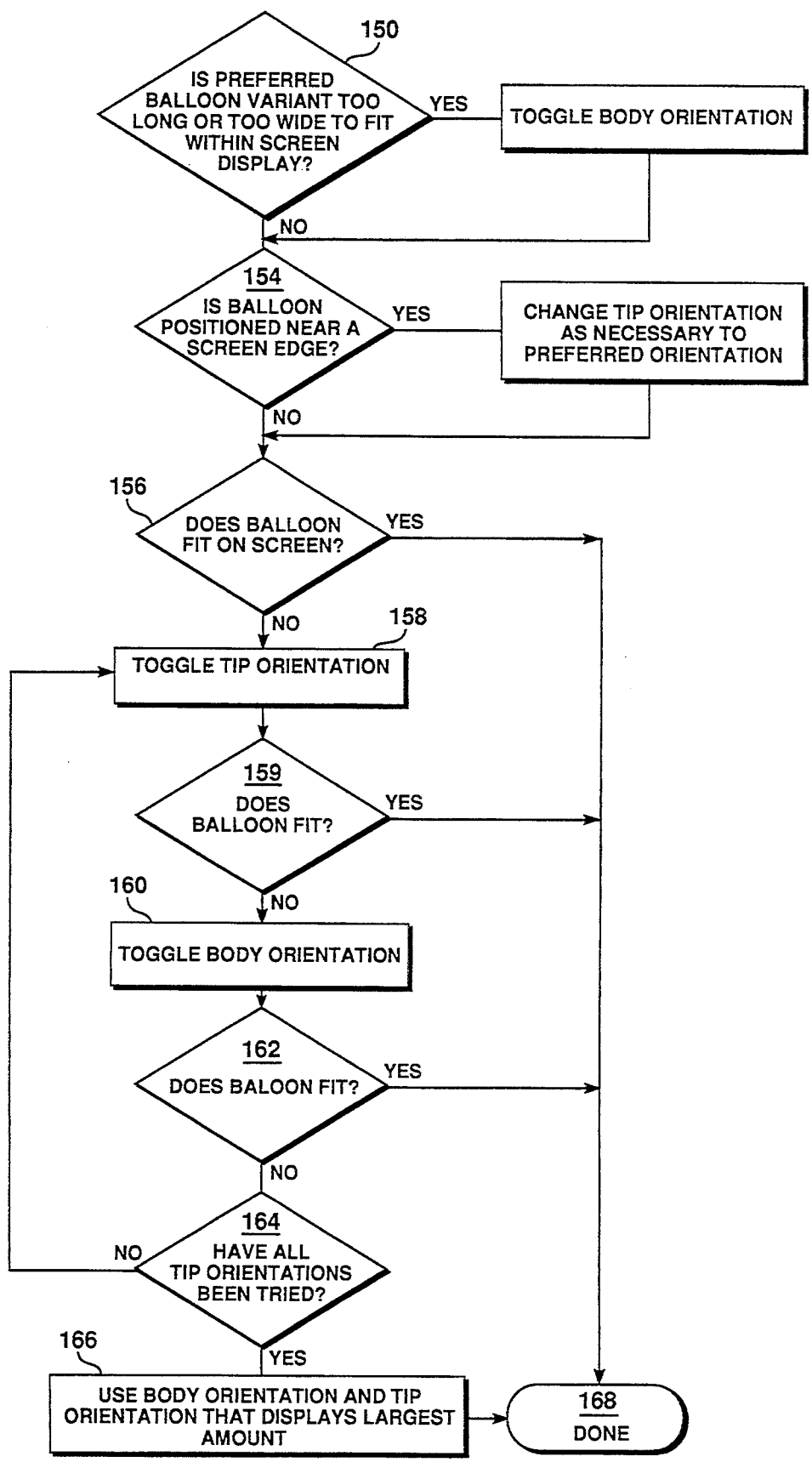
FIG. 6 is a flow diagram of a method of positioning a balloon within a display area.

A method of positioning help balloons on monitor 32 is shown in FIG. 6. Upon activation, computer system 30 begins positioning the balloon in step 150. Them computer system 30 determines whether there is enough room within the display screen to display the balloon using the preferred body and tip orientations. If the preferred variant is either too long or too wide for the display screen, then computer system 30 branches to step 152.

In step 152, computer system 30 attempts to fit the balloon within the display screen by changing the body orientation relative to the sensitive area with which it is associated. For example, if the preferred body orientation was to the right of the sensitive area (see FIGS. 3C, 3D, 3G, and 3H) then in step 152 computer system 30 will change the body orientation to the left of the sensitive area (see FIGS. 3A, 3B, 3E, and 3F).

From step 152 computer system 30 branches to step 154. Computer system also branches directly to step 154 from step 150 if the preferred balloon variant was not too long or too wide for the display screen. In step 154 computer system 30 determines whether the balloon is positioned near an edge of the display screen. This determination is made for aesthetic reasons. Balloons near the top or bottom of a display screen do not appear to float unless the tip is in a vertical orientation, like those tips of FIGS. 3B, 3C, 3F, and 3G. Similarly, balloons located near the left or right edge of a display screen do not appear to float unless the cartouche extends horizontally from the balloon body orientation, like those tips of FIGS. 3A, 3D, 3E, and 3H.

If the balloon's preferred orientation is near a screen edge, computer system 30 branches to step 156. In step 156 the balloon's tip orientation is set to make the balloon appear to float. For balloons positioned near the top of a display screen, their tip orientation is changed to a tip located on the balloon's bottom edge; i.e. either to to the tip orientation of FIG. 3F or 3G. Computer system 30 sets tip orientation to that of FIGS. 3B or 3C for balloon located near a display screen's bottom edge. For balloons positioned near the right edge of a display screen, computer system 30 changes the tip orientation to a horizontal orientation; i.e. to the orientation of either FIG. 3A or 3H. Finally, for balloons located near the left edge of a display screen computer system sets the tip orientation to either that of FIG. 3D or FIG. 3E.

Computer system 30 branches to step 156 from step 154. If the balloon is not positioned near a display screen edge, computer system 30 branches directly to step 156 from step 152. In step 156, computer system 30 determines whether a balloon with the current body and tip orientations fit within the display screen bounds. If the balloon does fit, computer system 30 branches to step 168. Having determined a balloon variant that will fit within the display screen, computer system 30 may now display that variant.

If, on the other hand, the current body and tip orientations do not fit on the display screen, computer system 30 branches from step 156 to step 158. In step 158 computer system 30 attempts to fit the balloon within the display screen by toggling the tip orientation, from horizontal to vertical or vice-versa as appropriate.

Figure 7A:
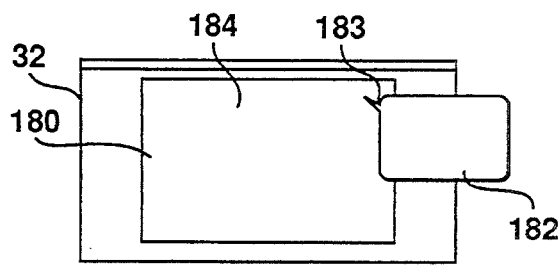
FIG. 7 illustrates various balloon positions examined by the method of FIG. 6.
Figure 7B:
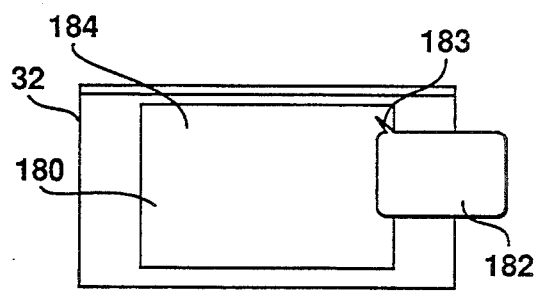

FIGS. 7A and 7B illustrate a case in which a balloon variant does not fit within a display screen. Each figure shows a display screen 180 on monitor 32. Entering step 156, the current balloon variant 182 is positioned to the right and toward the top of a sensitive area 184. Current balloon variant 182 has a tip 183 with a horizontal orientation. As seen in FIG. 7A, balloon variant 182 does not fit within display screen 180. Computer 30 attempts to fit a balloon within display screen 180 by toggling the orientation of tip 183, as shown in FIG. 7B. In other words, after execution of step 158 tip 183 is oriented vertically.

Computer system 30 determines the success of changing the tip orientation in step 159. If the balloon now fits within the display screen, computer system 30 branches to step 168. Having selected a balloon variant that fits within the display screen, computer system 30 may now display that variant.

If, on the other hand, the current balloon variant does not fit on the display screen, computer system 30 branches from step 159 to step 160. In step 160, computer system 30 attempts to fit the balloon with the display screen by changing the body orientation. For example, computer system 30 may change body orientation from the above to below a sensitive area or vice-versa. In step 160 computer system 30 also changes the tip orientation back to the preferred orientation.

Figure 7C:
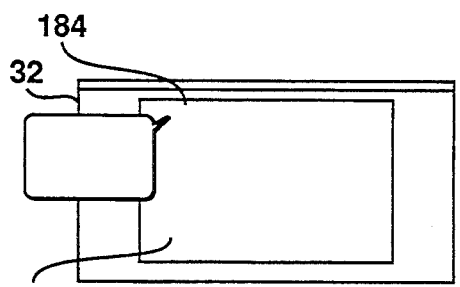

Computer system 30 may also toggle balloon body orientation left to the right of a sensitive area, or vice-versa. This case is illustrated in FIGS. 7B and 7C. Balloon 182 extends past the right side of display screen 180 in FIG. 7B. Computer system 30 responds to this situation by orienting balloon body to the left of sensitive area 184, as shown in FIG. 3C. Having changed the orientation of balloon 182, computer system 32 reverts to the preferred tip orientation for a balloon located near a horizontal edge of a display screen. In other words, balloon tip 183 once again extends horizontally from balloon 182.

Computer system 30 determines the success of changing the body orientation in step 162. If the balloon now fits within the display screen, computer system 30 branches to step 168. Computer system 30 may now display that variant.

If, on the other hand, the current balloon does not fit on the display screen, computer system 30 branches from step 162 to step 164. In step 164 computer system 30 determines whether all eight possible tip orientations have been tried. Until all eight tip orientations have been tried, computer system 30 branches from step 164 back to step 158.

Figure 7D:
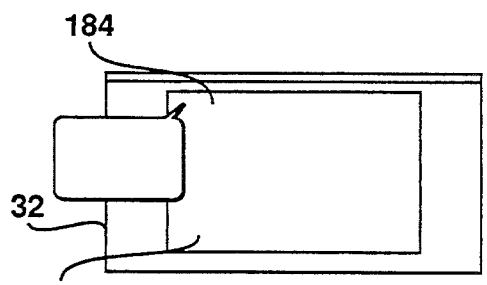

Upon returning to step 158, computer system 30 again changes the tip orientation of balloon 182. Thus, in FIG. 7D tip 183 moves to the right corner of the balloon's top edge.

Computer system 30 then determines whether the current variant fits on display screen. If the balloon now fits within the display screen, computer system 30 branches to step 168. Having selected a balloon variant that fits within the display screen, computer system 30 may now display that variant.

If, on the other hand, the current balloon variant does not fit on the display screen, computer system 30 branches from step 159 to step 160. In step 160, computer system 30 attempts to fit the balloon with the display screen by changing the orientation of the balloon body.

Figure 7:
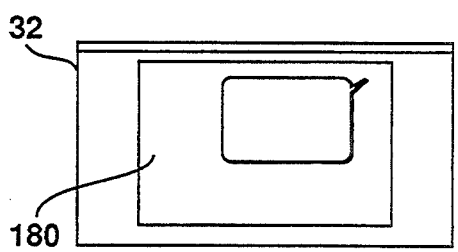
Figure 7E:
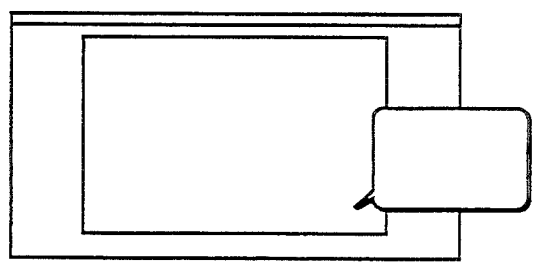

This case is illustrated in FIG. 7E. As a result of step 160, balloon 182 is oriented below and to the right of sensitive area 184. Tip 183 returns to the preferred vertical orientation for a balloon located near the top or bottom of a display screen.

Having changed the orientation of the body, computer system 30 again branches to step 162. There it is determined whether the current variant of the balloon fits on the display screen. If the balloon now fits within the display screen, computer system 30 branches to step 168. Having selected a balloon variant that fits within the display screen, computer system 30 may now display that variant.

If, on the other hand, the current balloon does not fit on the display screen, computer system 30 branches from step 162 to step 164. In step 164 computer system 30 again determines whether all eight possible tip orientations have been tried.

In the example of FIG. 7, all eight tip orientations have not yet been tried by the time computer system 30 reaches FIG. 7E. Computer system 30 therefore branches back to step 158.

Figure 7F:
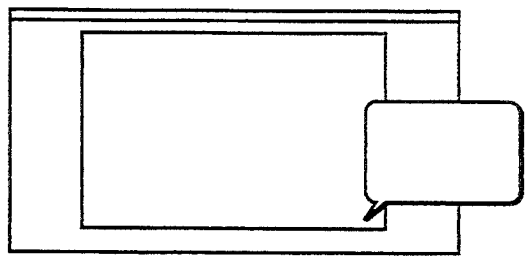

In step 158 computer system 30 again changes the orientation of tip 183. This change is shown in FIG. 7F, tip 183 residing on right side of the bottom edge of balloon 182.

Computer system 30 then branches to step 159 to determine the success of step 158. Because the variant of FIG. 7F does not fit within display screen 180, computer system 30 returns to step 160.

Figure 7G:
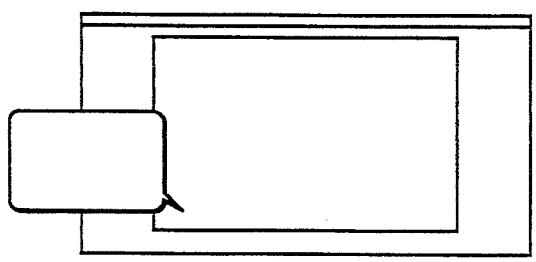

Once again in step 160 computer system 30 changes the orientation of balloon body relative to sensitive area 180. FIG. 7G illustrates the new orientation of balloon 182 to the left of sensitive area 184.

Computer system 30 examines the success of its latest efforts in step 162. If, as is the case in FIG. 7G, balloon 182 does not fit within display screen 180 then computer system branches to step 164.

Computer system 30 determines whether it should continue to changing balloon body and tip orientations in step 164. In the example of FIG. 7 not all tip orientation have been tried as of FIG. 7G, therefore computer system branches back to step 158.

Figure 7H:
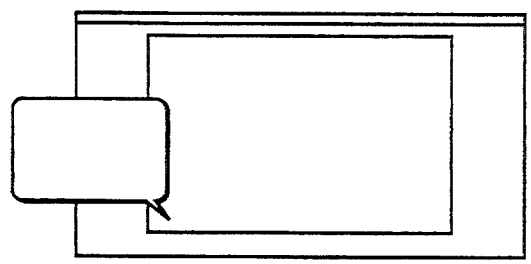

Computer system 30 once again changes the orientation of tip 183 in step 158. Tip 183 is now located near the bottom of the balloon's right side in FIG. 7H.

The fit of the current variant is determined in step 159. Computer system 30 once again discovers that the balloon does not fit on display screen 180.

Computer system therefore proceeds to step 160 to toggle the orientation of the balloon body relative to sensitive area 184. This returns the balloon to the variant of FIG. 7A.

Afterward, computer system 30 returns to step 162. There computer system 30 determines the success of step 160. Again, computer system finds that balloon 182 does not fit within display screen 180.

Computer system 30 proceeds once again to step 164. As all eight tip orientations have now been tried, computer system branches to step 166.

Having discovered that there is no balloon variant that fits within display screen 180, computer system 30 chooses the best balloon variant in step 166. That best variant is that variant which displays the greatest amount of the text within display screen 180. The dimensions of balloon 180 are altered to fit within display screen 180.

Computer system 30 then proceeds to step 168 where the selected variant of balloon 182 is displayed on display screen 180.

Thus, methods of calculating balloon dimensions and positioning a balloon within a display screen have been described. The present invention provides a means of quickly calculating dimensions of an aesthetically pleasing balloon. Afterward, the present invention determines a position for the balloon which does not obscure a sensitive area.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of positioning a balloon near a sensitive area within a display screen of a monitor of a computer system, the balloon having a body and a tip extending from the body towards the sensitive area, the balloon for enclosing information, the method comprising the steps of:
   a) initializing the balloon to a preferred variant, the preferred variant having a preferred body orientation with respect to the sensitive area and a preferred tip orientation with respect to the body;
   b) ending if the body of the balloon fits entirely within the display screen, wherein the balloon is displayed on the monitor;
   c) selecting a new tip orientation for the balloon from a set of possible tip orientations if the body of the balloon does not fit entirely within the display screen, wherein the new tip orientation has not been previously tried;
   d) ending if the body of the balloon fits entirely within the display screen, wherein the balloon is displayed on the monitor;
   e) selecting a new body orientation for of the balloon if the body of the balloon does not fit entirely within the display screen;
   f) ending if the body of the balloon fits entirely within the display screen, wherein the balloon is displayed on the monitor;
   g) repeating steps c) through f) if the body of the balloon does not fit entirely within the display screen and if not all possible tip orientations have been tried;
   h) selecting a body orientation and a tip orientation that displays a largest visible amount of information on the monitor if the body of the balloon does not fit entirely within the display screen and all possible tip orientations have been tried; and
   i) displaying the balloon on the monitor.

2. The method of claim 1 further comprising the step of:
   a) selecting a new tip orientation for the balloon if the preferred variant is near an edge of the display screen when positioned near the sensitive area.

3. The method of claim 1 wherein the set of possible tip orientations with respect to the body is:
   a) extending from an upper left-side of the body;
   b) extending from a lower left-side of the body
   c) extending from an upper right-side of the body;
   d) extending from a lower right-side of the body;
   e) extending a left side of a top of the body;
   f) extending a right side of the top of the body;
   g) extending from a left side of a bottom of the body; and
   h) extending from a right side of the bottom of the body.

4. A method of positioning a balloon near a sensitive area within a display screen of a monitor of a computer system, the balloon having a body and a tip extending from the body towards the sensitive area, the balloon for enclosing information, the method comprising the steps of:
   a) initializing the balloon to a preferred variant, the preferred variant having a preferred body orientation with respect to the sensitive area and a preferred tip orientation with respect to the body;
   b) selecting a new tip orientation for the balloon if the preferred variant is near an edge of the display screen when positioned near the sensitive area;
   c) ending if the body of the balloon fits entirely within the display screen, wherein the balloon is displayed on the monitor;
   d) selecting a new tip orientation for the balloon from a set of possible tip orientations if the body of the balloon does not fit entirely within the display screen;
   e) ending if the body of the balloon fits entirely within the display screen wherein the balloon is displayed on the monitor;
   f) selecting a new body orientation for the balloon if the body of the balloon does not fit entirely within the display screen;
   g) ending if the body of the balloon fits entirely within the display screen, wherein the balloon is displayed on the monitor;
   h) repeating steps d) through g) if the body of the balloon does not fit entirely within the display screen and if not all possible tip orientations have been tried;
   i) selecting a body orientation and a tip orientation that displays a largest amount of information on the monitor if the body of the balloon does not fit entirely within the display screen and all possible tip orientations have been tried; and
   j) displaying the balloon on the monitor.

5. The method of claim 4 wherein the set of possible tip orientations with respect to the body is:
   a) extending from an upper left-side of the body;
   b) extending from a lower left-side of the body
   c) extending from an upper right-side of the body;
   d) extending from a lower right-side of the body;
   e) extending a left side of a top of the body;
   f) extending a right side of the top of the body;
   g) extending from a left side of a bottom of the body; and
   h) extending from a right side of the bottom of the body.

6. A method for dimensioning and displaying a balloon near a sensitive area within a display screen of a monitor of a computer system, the balloon having a body for enclosing information and a tip extending from the body towards the sensitive area, the body of the balloon having a first balloon dimension and a second balloon dimension wherein the first balloon dimension is greater than the second balloon dimension, the method comprising the steps of:
   a) computing an initial area of the balloon based on a length of the information;
   b) initially calculating the second balloon dimension based upon the initial area and a golden ratio, wherein the golden ratio relates the first balloon dimension to the second balloon dimension;
   c) initially calculating the first balloon dimension based on the second balloon dimension and the golden ratio;
   d) ending calculation of the first and second balloon dimensions if the information is fully visible in a balloon having the first and second balloon dimensions;
   e) initializing the balloon having the first and second balloon dimensions to a preferred variant, the preferred variant having a preferred body orientation with respect to the sensitive area and a preferred tip orientation with respect to the body;
   f) displaying the balloon on the monitor if the body of the balloon is fully visible within the display screen;
   g) selecting a new tip orientation for the balloon from a set of possible tip orientations if the body of the balloon does not fit entirely within the display screen, wherein the new tip orientation has not been previously tried;
   h) displaying the balloon on the monitor if the body of the balloon is fully visible within the display screen;
   i) selecting a new body orientation for of the balloon if the body of the balloon does not fit entirely within the display screen;
   j) displaying the balloon on the monitor if the body of the balloon is fully visible within the display screen;
   k) repeating steps g) through j) if the body of the balloon does not fit entirely within the display screen and if not all possible tip orientations have been tried;
   l) selecting a body orientation and a tip orientation for the balloon that displays a largest visible amount of information on the display screen if the body of the balloon does not fit entirely within the display screen and if all possible tip orientations have been tried; and
   m) displaying the balloon on the monitor.

7. The method of claim 6, further comprising the step of selecting a new tip orientation for the balloon if the preferred variant is near an edge of the display screen when positioned near the sensitive area.

8. The method of claim 6, wherein the set of possible tip orientations with respect to the body includes:
   a) extending from an upper left-side of the body;
   b) extending from a lower left-side of the body;
   c) extending from an upper right-side of the body;
   d) extending from a lower right-side of the body;
   e) extending from a left side of a top of the body;
   f) extending from a right side a top of the body;
   g) extending from a left side of a bottom of the body; and
   h) extending from a right side a bottom of the body.

9. A method for dimensioning and displaying a balloon near a sensitive area within a display screen of a monitor of a computer system, the balloon having a body for enclosing information and a tip extending from the body towards the sensitive area, the body of the balloon having a first balloon dimension and a second balloon dimension wherein the first balloon dimension is greater than the second balloon dimension, the method comprising the steps of:

a) computing an initial area of the balloon based on a length of the information;

b) initially calculating the second balloon dimension based upon the initial area and a golden ratio, wherein the golden ratio relates the first balloon dimension to the second balloon dimension;

c) initially calculating the first balloon dimension based on the second balloon dimension and the golden ratio;

d) ending calculation of the first and second balloon dimensions if the information is fully visible in a balloon having the first and second balloon dimensions;

e) increasing the second balloon dimension if the information does not fit in the rectangular balloon such that the second balloon dimension is greater than the first balloon dimension and the golden ratio is maintained;

f) ending if the information fits in the rectangular balloon having the first dimension and the second dimension;

g) increasing the first dimension by a first amount if the information does not fit in the rectangular balloon;

h) ending if the information fits in the rectangular balloon having the first dimension and the second dimension;

i) repeating steps e) through h) until the information fits in the rectangular balloon;

j) initializing the balloon having the first and second balloon dimensions to a preferred variant, the preferred variant having a preferred body orientation with respect to the sensitive area and a preferred tip orientation with respect to the body;

k) displaying the balloon on the monitor if the body of the balloon is fully visible within the display screen;

l) selecting a new tip orientation for the balloon from a set of possible tip orientations if the body of the balloon does not fit entirely within the display screen, wherein the new tip orientation has not been previously tried;

m) displaying the balloon on the monitor if the body of the balloon is fully visible within the display screen;

n) selecting a new body orientation for of the balloon if the body of the balloon does not fit entirely within the display screen;

o) displaying the balloon on the monitor if the body of the balloon is fully visible within the display screen;

p) repeating steps l) through o) if the body of the balloon does not fit entirely within the display screen and if not all possible tip orientations have been tried;

q) selecting a body orientation and a tip orientation for the balloon that displays a largest visible amount of information on the display screen if the body of the balloon does not fit entirely within the display screen and if all possible tip orientations have been tried; and r) displaying the balloon on the monitor.

10. The method of claim 9, further comprising the step of selecting a new tip orientation for the balloon if the preferred variant is near an edge of the display screen when positioned near the sensitive area.

11. The method of claim 9, wherein the set of possible tip orientations with respect to the body includes:

a) extending from an upper left-side of the body;
b) extending from a lower left-side of the body;
c) extending from an upper right-side of the body;
d) extending from a lower right-side of the body;
e) extending from a left side of a top of the body;
f) extending from a right side a top of the body;
g) extending from a left side of a bottom of the body; and
h) extending from a right side a bottom of the body.

* * * * *